US012792363B2

(12) United States Patent
Atina et al.

(10) Patent No.: US 12,792,363 B2
(45) Date of Patent: Nov. 10, 2026

(54) EXTENDED BERKELEY PACKET FILTER-BASED METHOD INVOCATION DATA COLLECTION FOR AGENTLESS OBSERVABILITY

(71) Applicant: Cisco Technology, Inc., San Jose, CA (US)

(72) Inventors: Chandrasekhar Atina, Sunnyvale, CA (US); Jaideep Padhye, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 144 days.

(21) Appl. No.: 18/807,224

(22) Filed: Aug. 16, 2024

(65) Prior Publication Data

US 2026/0050447 A1 Feb. 19, 2026

(51) Int. Cl.
*G06F 9/445* (2018.01)
*G06F 11/3698* (2025.01)

(52) U.S. Cl.
CPC ................................ *G06F 9/44505* (2013.01)

(58) Field of Classification Search
CPC ......................... G06F 9/44505; G06F 11/3698
USPC .............................................................. 713/1
See application file for complete search history.

(56) References Cited

U.S. PATENT DOCUMENTS 5,938,766 A * 8/1999 Anderson ................. G06F 8/65 348/231.2
6,457,142 B1 * 9/2002 Klemm ............... G06F 11/3476 714/38.12
9,213,830 B2 * 12/2015 Achutha ................. G06F 21/52
10,747,875 B1 * 8/2020 Stoler .................... H04L 9/3247
10,873,592 B1 * 12/2020 Singh .................. H04L 63/1425
11,709,746 B1 * 7/2023 Sommers .............. G06F 11/263 714/33
2004/0163079 A1 * 8/2004 Noy .................... G06F 11/3409 700/28

(Continued)

FOREIGN PATENT DOCUMENTS

CN 115664930 A 1/2023
CN 117591436 A 2/2024

OTHER PUBLICATIONS

Cakir K.F., "Exploring Function Tracing with eBPF and Uprobes—Episode 1", Anteon, May 15, 2024, Retrieved from https://getanteon.com/blog/exploring-function-tracing-with-ebpf-and-uprobes/ on Jun. 4, 2024, pp. 1-11.

(Continued)

*Primary Examiner* — Paul R. Myers
(74) *Attorney, Agent, or Firm* — Merchant & Gould P.C.; Kenneth J. Heywood

(57) ABSTRACT

In one implementation, a device may obtain a method invocation data collector configuration definition specifying a targeted function for monitoring. The device may generate, based on the method invocation data collector configuration definition, an extended Berkeley Packet Filter (eBPF) probe configuration for a targeted application. The device may deploy eBPF probe configuration to an eBPF agent to cause the eBPF agent to collect invocation metrics for the targeted function without modifying the targeted application. The device may cause, based on the invocation metrics collected by the eBPF agent, operational metrics to be added to a trace for the targeted application.

20 Claims, 6 Drawing Sheets

(56) References Cited

U.S. PATENT DOCUMENTS

| | | | | |
|---|---|---|---|---|
| 2006/0271600 | A1* | 11/2006 | Goh | G06F 16/275 |
| 2014/0059528 | A1* | 2/2014 | Gagliardi | G06F 8/656 717/170 |
| 2018/0288129 | A1* | 10/2018 | Joshi | H04L 43/08 |
| 2019/0005234 | A1* | 1/2019 | Klonowski | G06F 21/566 |
| 2020/0193017 | A1* | 6/2020 | Bannister | G06F 21/554 |
| 2020/0394329 | A1 | 12/2020 | Jayaprakash et al. | |
| 2021/0390182 | A1* | 12/2021 | Boutnaru | G06F 8/433 |
| 2022/0147434 | A1 | 5/2022 | Asgar et al. | |
| 2022/0147542 | A1* | 5/2022 | Asgar | G06F 11/323 |
| 2023/0030795 | A1* | 2/2023 | Govindarajan | G06F 9/5011 |
| 2023/0370349 | A1* | 11/2023 | Ashlock | H04L 43/12 |
| 2023/0385403 | A1* | 11/2023 | Czerninski | G06F 21/54 |
| 2024/0012918 | A1* | 1/2024 | Yannuzzi | G06F 21/62 |
| 2024/0053978 | A1* | 2/2024 | Li | G06F 8/65 |
| 2024/0104221 | A1* | 3/2024 | Saieva | G06F 11/3698 |
| 2024/0340267 | A1* | 10/2024 | van der Merwe | H04L 45/586 |
| 2024/0411664 | A1* | 12/2024 | Frey | G06F 9/44505 |
| 2025/0028929 | A1* | 1/2025 | Stan | G06N 3/043 |
| 2025/0039146 | A1* | 1/2025 | Zhang | H04L 63/0272 |
| 2025/0156240 | A1* | 5/2025 | Seshadri | G06F 9/485 |

OTHER PUBLICATIONS

GitHub: "A Java Agent to Generate Method Mappings to Use with the Linux 'Perf Tool", Jvm-profiling-tools / perf-map-agent, Retrieved from https://github.com/jvm-profiling-tools/perf-map-agent on Jun. 4, 2024, pp. 1-6.

GitHub: "OpenTelemetry Auto-Instrumentation for Go Applications", Odigos-io / Opentelemetry-go-instrumentation, Retrieved from https://github.com/odigos-io/opentelemetry-go-instrumentation on Jun. 4, 2024, pp. 1-3.

GitHub: "Trace Go Program Execution with Uprobes and eBPF", Grantseltzer / Weaver, Retrieved from https://github.com/grantseltzer/weaver on Jun. 4, 2024, pp. 1-5.

Grafana Labs: "Grafana Beyla", Retrieved from https://grafana.com/docs/beyla/latest/ on Jun. 4, 2024, pp. 1-7.

Pixie: "Request Tracing", Retrieved from https://docs.px.dev/tutorials/pixie-101/request-tracing/ on Jun. 4, 2024, pp. 1-6.

* cited by examiner

500

EXTENDED BERKELEY PACKET FILTER-BASED METHOD INVOCATION DATA COLLECTION FOR AGENTLESS OBSERVABILITY

TECHNICAL FIELD

The present disclosure relates generally to computer networks and more particularly to extended Berkeley Packet Filter (eBPF)-based method invocation data collection for agentless observability.

BACKGROUND

Modern applications generate vast amounts of data that need to be collected, processed, and analyzed to provide insights into their performance and user interactions. This process, often referred to as observability, involves monitoring various operational metrics and application transactions to understand improve application behavior.

Traditionally, collecting these metrics and transactions has required manual instrumentation by application developers. This approach involves embedding specific monitoring code into the application, which must then be redeployed to take effect. While this method can capture detailed data, it is labor-intensive, error-prone, and disrupts normal application operations due to the need for redeployment.

The current manual instrumentation approach places a heavy burden on developers, who must continuously update and maintain the instrumentation code. Further this necessity to redeploy with this approach introduces downtime and potential service interruptions, negatively impacting user experience. Furthermore, this process is inflexible, making it difficult to adapt to changing monitoring requirements without further redeployment. These challenges can lead to incomplete or outdated data collection, reducing the effectiveness of application performance monitoring and hindering the ability to promptly address performance issues.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

According to one or more implementations of the disclosure, a device may obtain a method invocation data collector configuration definition specifying a targeted function for monitoring. The device may generate, based on the method invocation data collector configuration definition, an extended Berkeley Packet Filter (eBPF) probe configuration for a targeted application. The device may deploy eBPF probe configuration to an eBPF agent to cause the eBPF agent to collect invocation metrics for the targeted function without modifying the targeted application. The device may cause, based on the invocation metrics collected by the eBPF agent, operational metrics to be added to a trace for the targeted application.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
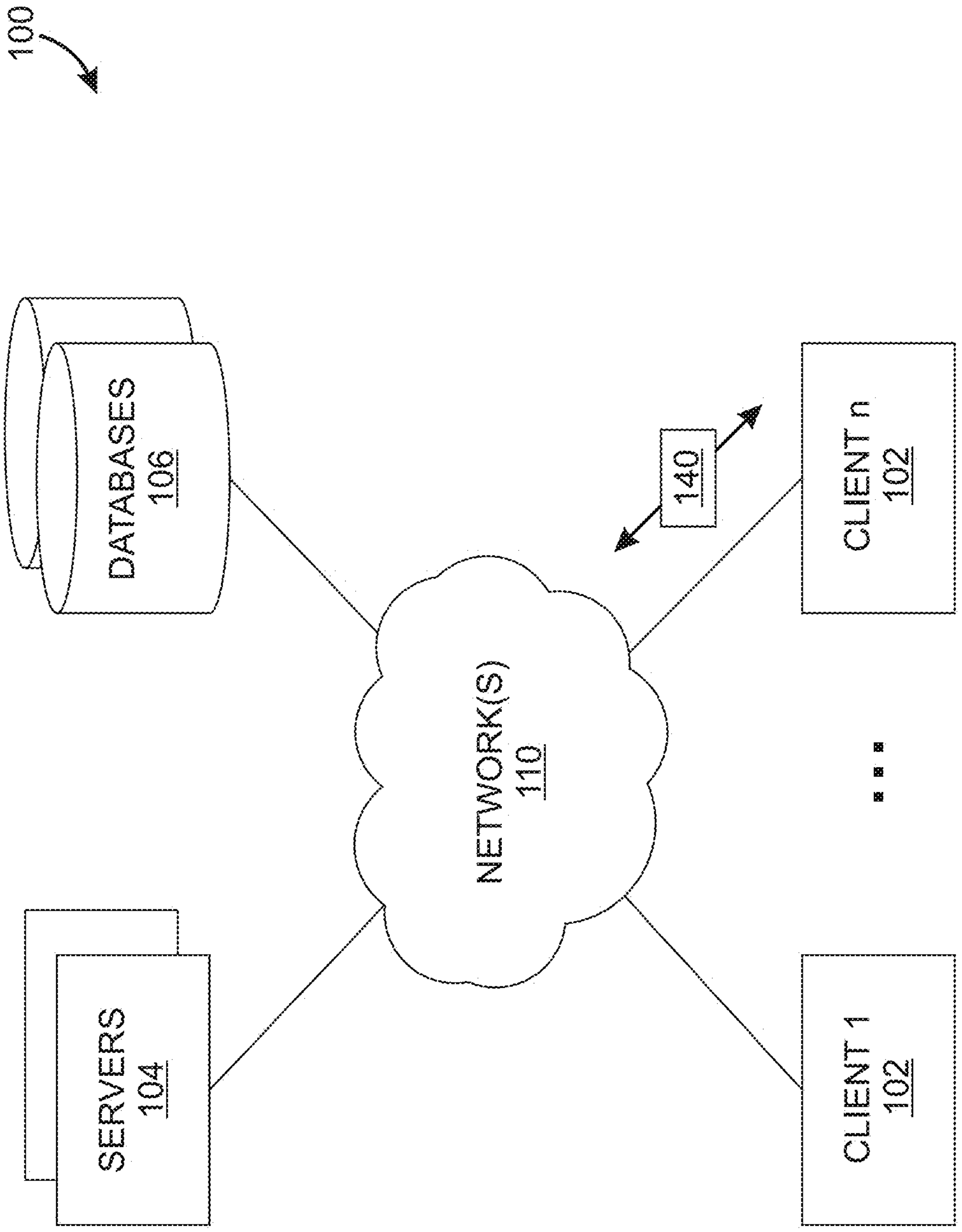
FIG. 1 illustrates an example computer network.

FIG. 1 is a schematic block diagram of an example simplified computing system (e.g., the computing system 100), which includes client devices 102 (e.g., a first through nth client device), one or more servers 104, and databases 106 (e.g., one or more databases), where the devices may be in communication with one another via any number of networks (e.g., network(s) 110). The network(s) 110 may include, as would be appreciated, any number of specialized networking devices such as routers, switches, access points, etc., interconnected via wired and/or wireless connections. For example, client devices 102, the one or more servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, the one or more servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
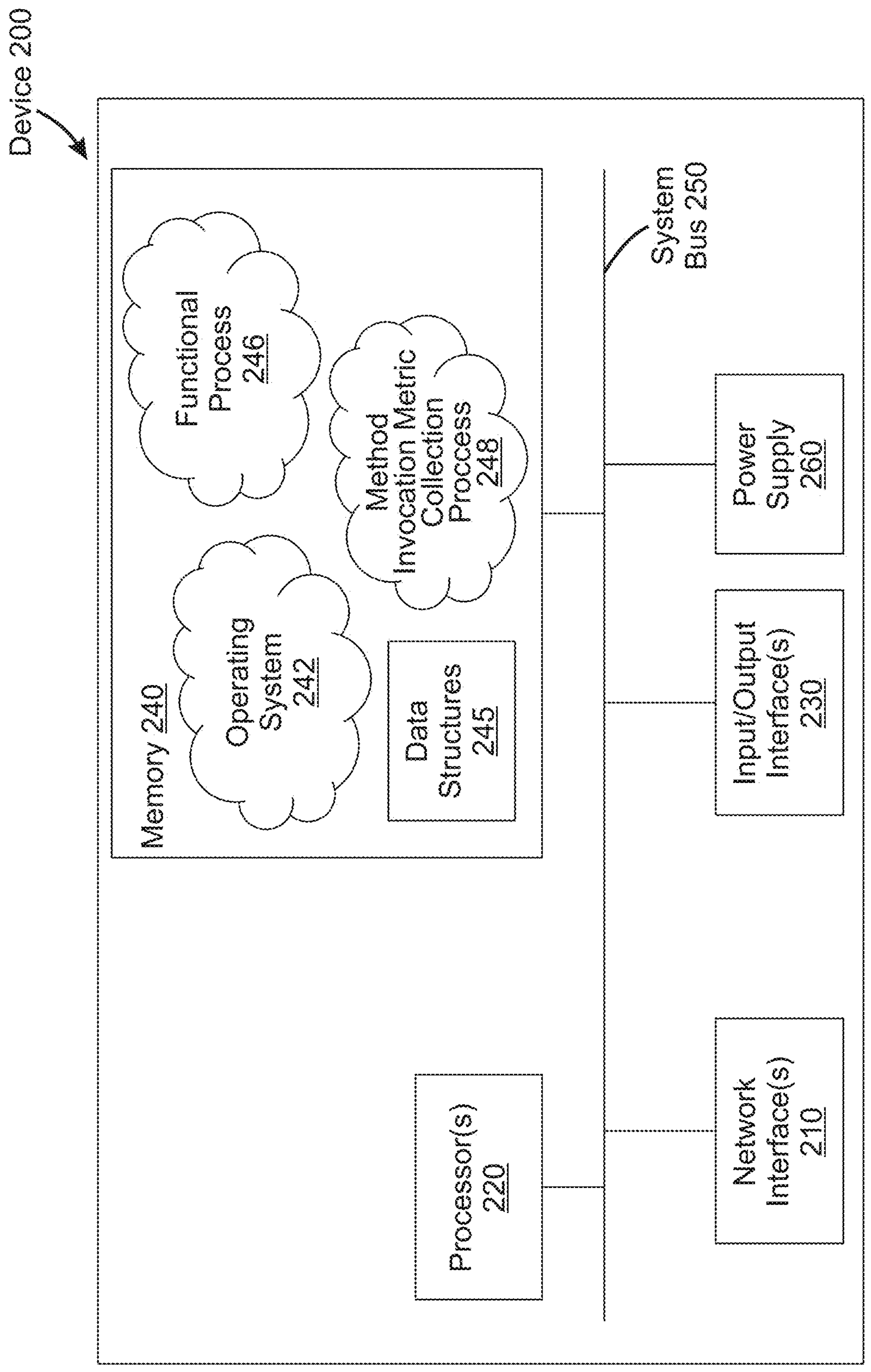
FIG. 2 illustrates an example computing device/node.

FIG. 2 is a schematic block diagram of an example node/device 200 (e.g., an apparatus) that may be used with one or more implementations described herein, e.g., as any of the devices shown in FIG. 1 above. Device 200 may comprise one or more network interfaces, such as interfaces 210 (e.g., wired, wireless, network interfaces, etc.), at least one processor (e.g., processor 220), and a memory 240 interconnected by a system bus 250, as well as a power supply 260 (e.g., battery, plug-in, etc.).

The interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes (e.g., functional processes 246), and on certain devices, an illustrative process such as method invocation metric collection process 248, as described herein. Notably, functional processes 246, when executed by processor 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, method invocation metric collection process 248 may include computer executable instructions that, when executed by processor 220, cause device 200 to perform the techniques described herein. To do so, in some implementations, method invocation metric collection process 248 may utilize and/or be a component of machine learning implementations. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, method invocation metric collection process 248 may employ and/or be utilized to handle prompts to and/or access of one or more supervised, unsupervised, or semi-supervised machine learning models. Generally, supervised learning entails the use of a training set of data that is used to train the model to apply labels to the input data. For example, the training data may include sample configurations labeled with textual metadata. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that the method invocation metric collection process 248 can employ and/or be utilized in concert with may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, method invocation metric collection process 248 may also include, or otherwise use or be employed to operate with, one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of configuring an observability platform to perform certain application analytics, method invocation metric collection process 248 may be a component of, use, and/or be utilized in the management of prompts/access to a generative model to perform network mapping, generate configurations, perform analyses, perform root cause analysis, or other outputs based on a conversational input from a user (e.g., voice, text, etc.). In another example, method invocation metric collection process 248 may utilize a generative model with a method invocation data collector (MIDC) to assist in automated or manual identification of transactional attributes for spans. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
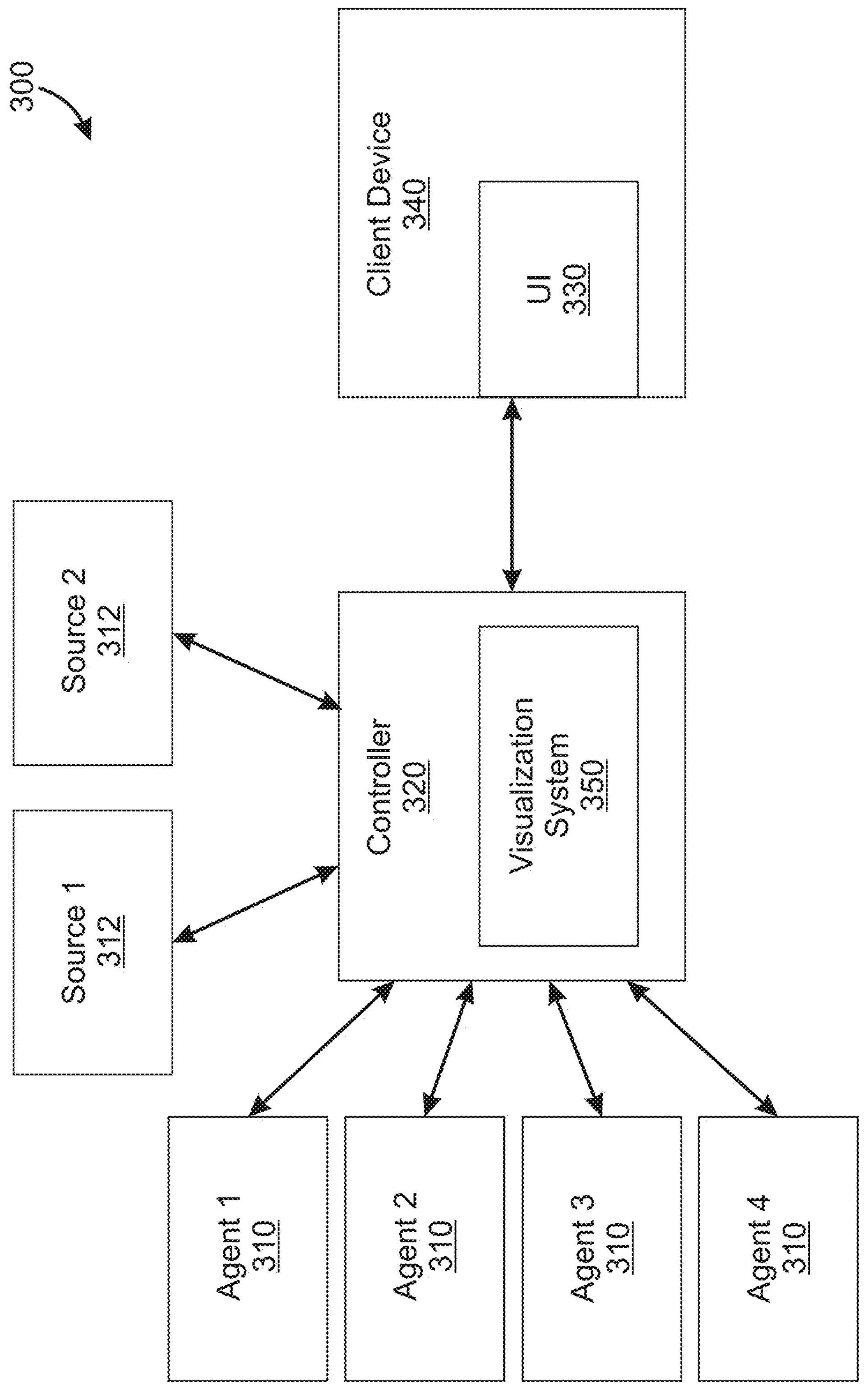
FIG. 3 illustrates an example observability intelligence platform.

FIG. 3 is a block diagram of an example of an observability intelligence platform 300 that can implement one or more aspects of the techniques herein. The observability intelligence platform 300 is a system that monitors and collects metrics of performance data for a network and/or application environment being monitored. At the simplest structure, the observability intelligence platform 300 includes one or more agents (e.g., agents 310), one or more sources (e.g., sources 312), and one or more servers/controllers (e.g., controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform 300. The controller 320 may serve a user interface 330 (denoted UI in FIG. 3), such as a browser-based UI, that is the primary interface for monitoring, analyzing, and troubleshooting the monitored environment. Specifically, the controller 320 can receive data from agents 310, sources 312 (and/or other coordinator devices), associate portions of data (e.g., topology, transaction end-to-end paths and/or metrics, etc.), communicate with agents to configure collection of the data (e.g., the instrumentation/tests to execute), and provide performance data and reporting through user interface 330. User interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, a controller 320 may be installed locally and self-administered.

The controllers 320 receive data from the agents 310 (e.g., Agents 1-4) and/or sources 312 deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application. Further, the controllers 320 can receive data from sources 312 (e.g., sources 1-2). Any of the sources can be implemented to provide various types of observability data that can include information, metrics, telemetry data, business data, network data, etc.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be implemented as small files using web-based technologies, such as JavaScript agents injected into each instrumented web page (e.g., as close to the top as possible) as the web page is served and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

An application transaction, in particular, is a representation of the particular service provided by the monitored environment that provides a view on performance data in the context of the various tiers that participate in processing a particular request. That is, an application transaction, which may be identified by a unique application transaction identification (ID), represents the end-to-end processing path used to fulfill a service request in the monitored environment (e.g., adding items to a shopping cart, storing information in a database, purchasing an item online, etc.). Thus, an application transaction is a type of user-initiated action in the monitored environment defined by an entry point and a processing path across application servers, databases, and potentially many other infrastructure components. Each instance of an application transaction is an execution of that transaction in response to a particular user request (e.g., a socket call, illustratively associated with the TCP layer). An application transaction can be created by detecting incoming requests at an entry point and tracking the activity associated with request at the originating tier and across distributed components in the application environment (e.g., associating the application transaction with a 4-tuple of a source IP address, source port, destination IP address, and destination port). A flow map can be generated for an application transaction that shows the touch points for the application transaction in the application environment. In one implementation, a specific tag may be added to packets by application specific agents for identifying application transactions (e.g., a custom header field attached to a hypertext transfer protocol (HTTP) payload by an application agent, or by a network agent when an application makes a remote socket call), such that packets can be examined by network agents to identify the application transaction identifier (ID) (e.g., a Globally Unique Identifier (GUID) or Universally Unique Identifier (UUID)). Performance monitoring can be oriented by application transaction to focus on the performance of the services in the application environment from the perspective of end users. Performance monitoring based on application transactions can provide information on whether a service is available (e.g., users can log in, check out, or view their data), response times for users, and the cause of problems when the problems occur.

In accordance with certain implementations, both self-learned baselines and configurable thresholds may be used to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or application transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be implemented across multiple devices, on different devices, utilizing additional devices, and so on, and the views shown herein are merely simplified examples that are not meant to be limiting to the scope of the present disclosure.

As noted above, observability features like operational metrics (e.g., metrics that reflect the performance and/or efficiency of an application such as response times, error rates, resource utilization, etc., which may sometimes be referred to as business metrics) depend on data collected as OTEL span attributes which are part of application transactions (e.g., complete sequences of user interactions within the application, such as logging in, searching for data, submitting forms, completing actions, etc., which may sometimes be referred to as business transactions). The traditional approach for collecting span attributes requires manual instrumentation by application developers. This approach is very cumbersome as it requires the re-deployment of the application.

Extended Berkeley Packet Filter-Based Method Invocation Data Collection for Agentless Observability In contrast, the techniques described herein introduce an agent (e.g., OTEL agent) extension that dynamically receives configuration and adds the span attributes without requiring code changes. Extended Berkeley Packet Filter (eBPF) technology has established itself as a powerful tool in the domain of system tracing and performance analysis. The existing state-of-the-art leverages eBPF's advanced capabilities for tracing functions within both the Linux kernel and user space applications. This is achieved by attaching eBPF programs to various hooks or events, such as system calls, function entry/exit points, and network events, to collect a wide range of data in a highly efficient manner.

The techniques described herein introduce a mechanism for collecting method invocation data for application observability. More specifically, these techniques utilize eBPF technology to gather method invocation metrics directly from a running application without the need for additional instrumentation agents, thereby enabling real-time monitoring without service interruption or performance degradation. This approach allows the customer to specify attributes to be collected without redeploying the application and doesn't require the attaching of an agent.

As a result, these techniques provide a way to dynamically monitor and add relevant (e.g., operationally relevant, business relevant, etc.) attributes to application traces without requiring any code changes or redeployment of the application. Unlike the traditional way of instrumenting a target application with a language-specific agent, in this approach the DevOps owner doesn't have to rely on developers to make code changes and there is no downtime due to application redeployment.

Illustratively, the techniques described herein may be performed by hardware, software, and/or firmware, such as in accordance with method invocation metric collection process 248, which may include computer executable instructions executed by the processor 220 (or independent processor of interfaces 210) to perform functions relating to the techniques described herein.

Specifically, according to various implementations, a device may a device may obtain a method invocation data collector configuration definition specifying a targeted function for monitoring. The device may generate, based on the method invocation data collector configuration definition, an extended Berkeley Packet Filter (eBPF) probe configuration for a targeted application. The device may deploy eBPF probe configuration to an eBPF agent to cause the eBPF agent to collect invocation metrics for the targeted function without modifying the targeted application. The device may cause, based on the invocation metrics collected by the eBPF agent, operational metrics to be added to a trace for the targeted application.

Figure 4:
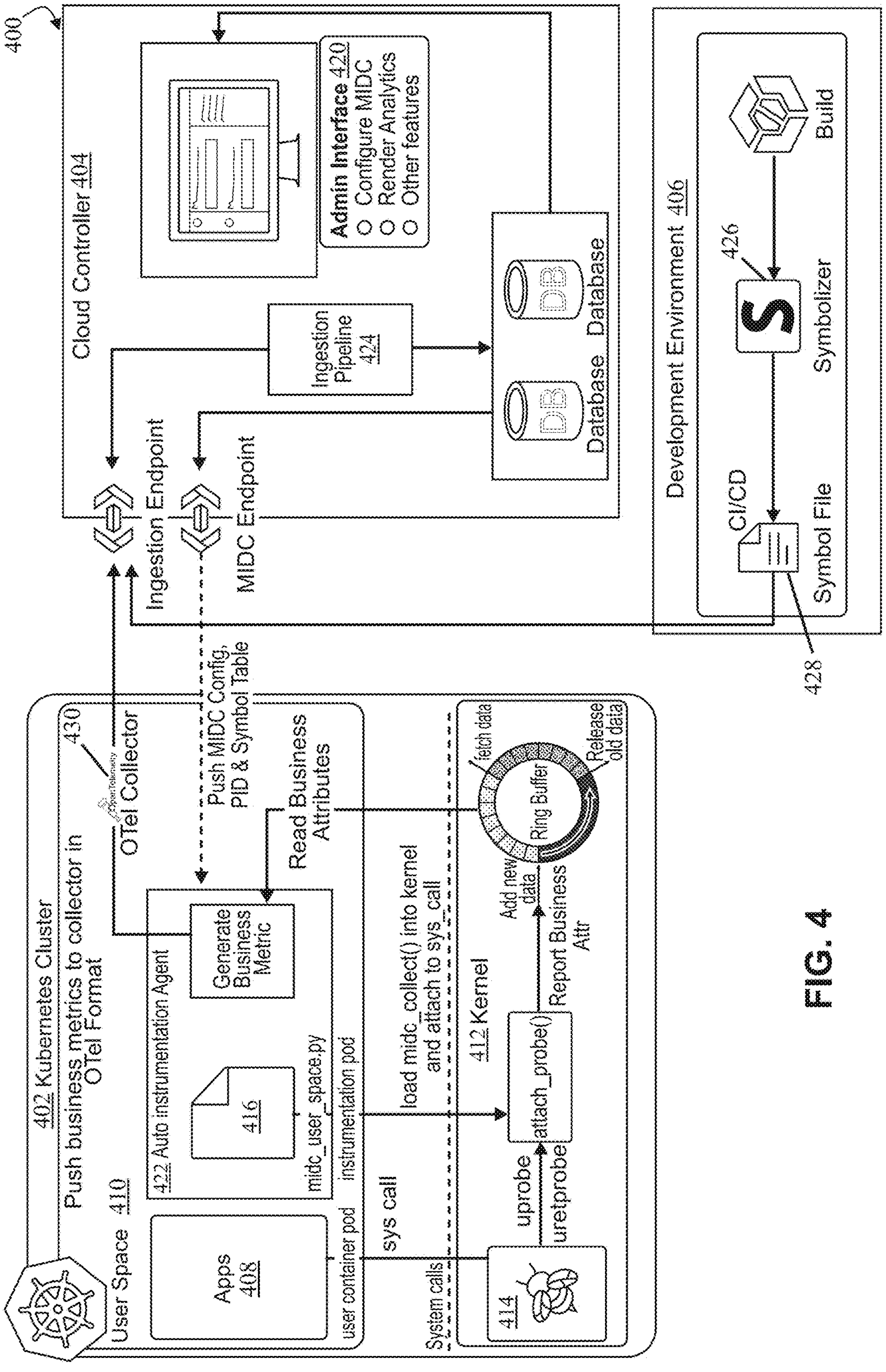
FIG. 4 illustrates an example of an architecture for eBPF-based method invocation data collection for agentless observability.

Operationally, FIG. 4 illustrates an example of an architecture 400 for eBPF-based method invocation data collection for agentless observability, in accordance with one or more implementations described herein. As outlined above, in the field of application performance monitoring, the collection of method invocation data is crucial for ensuring the reliability and efficiency of software applications. Traditional methods involve the use of instrumented agents that are integrated within the customer's environment to collect data based on pre-configured settings managed from an administrative portal. However, this process often requires the application to be restarted for the instrumentation and/or code changes to take effect, which can lead to service disruptions and potential data loss.

In contrast, architecture 400 introduces an agentless data collection architecture that leverages the capabilities of eBPF. eBPF is a modern kernel technology that allows for dynamic tracing of applications at runtime without the need to alter the application's source code or binary.

The architecture 400 may include communicatively coupled environments such as a Kubernetes cluster 402, a cloud controller 404, and/or a development environment 406. Each of these environments may play a role in ensuring efficient, real-time data collection and analysis.

In the Kubernetes cluster 402, applications 408 may run in a user space 410, performing various operations that need to be monitored. The eBPF programs 414, which operate within the kernel space 412, may be dynamically attached to the running applications (e.g., applications 408). These eBPF programs 414 may be responsible for tracing method invocations and collecting data such as method names, execution times, parameters, etc. The "midc_user_space.py" component 416 in the user space 410 may be configured to interact with these eBPF programs 414, configuring them according to the defined settings to collect particular operational metrics.

The cloud controller 404 may serve as the central management interface for the entirety of architecture 400. It may include an administrative interface 420 where users can define a method invocation data collector (MIDC) configuration. These configurations may specify what data should be collected by the eBPF programs 414.

For example, a user may be able to specify specific attributes of interest to be collected. Once defined, the configurations may be pushed to an auto instrumentation agent 422, which in turn may configure the eBPF programs 414 with the "midc_user_space.py" component 416 accordingly. The cloud controller 404 may also include an ingestion pipeline 424 that may process the collected data and a database that stores this data for further analysis.

To reiterate, in architecture 400 the MIDC configurations may be defined within an administrative interface 420. Which means that, instead of pulling these configurations into traditional instrumented agents, an eBPF program 414 is dynamically attached to the application's running processes. The eBPF program 414 is configured to monitor and collect method invocation data based on the specified MIDC settings.

Once the eBPF program 414 is attached and configured, it begins to collect data about method invocations, such as method names, execution times, and parameters, among other metrics. This data is then relayed to a telemetry data collector 430 (e.g., an OpenTelemetry collector, etc.), or a similar data aggregation system, for processing and analysis. The collected data provides insights into the application's performance and behavior, thereby enabling developers and system administrators to observe and diagnose issues in real time.

From time to time, a user may identify a new or different attribute or set of attributes that they would like to target for monitoring in their applications. In such instances, the user may simply modify their MIDC configuration definition to cause the collection of these attributes. The MIDC configuration can then be pushed to the auto instrumentation agent 422 where it will be loaded into the kernel and attached to a sys_call to begin collecting these newly targeted attributes, all without requiring any redeployment or downtime. Therefore, architecture 400 offers unparalleled application stability and targeted attribute collection dynamicity.

In compiled languages, the address space of functions is static and deterministic, allowing for a direct and simple mapping from virtual addresses to their corresponding function names. However, in interpreted languages that employ just-in-time (JIT) compilation, functions may be compiled on the fly and loaded at varying memory addresses during execution. This dynamic behavior may necessitate a more sophisticated method of tracing to accurately identify and monitor function calls.

To bridge this gap, architecture 400 incorporates a symbolizer 426 component within the MIDC system. The symbolizer 426 component may be integrated into a continuous integration/continuous deployment (CI/CD) workflow. The symbolizer 426 component may be configured to maintain an up-to-date mapping of virtual addresses to their actual function names, even as they are dynamically generated and potentially relocated in memory. This enables the MIDC system to correctly interpret the function tracing data at runtime, ensuring that the collected metrics are accurate and reflective of the current execution state of the application using technology like JVMTI (e.g., JVM profilers may use a similar approach to attach the agent to the running process ID to generate a symbolizer).

The symbolizer 426 component may generate symbol files 428 that may be leveraged for accurate data collection by the eBPF programs 414, especially in environments that employ JIT compilation. The symbol files 428 may include the mapping of the virtual addresses to their corresponding function names, ensuring that the eBPF programs can correctly interpret and trace the dynamically compiled functions.

This eBPF-based method of data collection in architecture 400 may provide offers a non-intrusive approach to the dynamically targeted collection of operational metrics in a manner that eliminates the need for restarting the application or incorporating additional monitoring agents. As such, an application's performance remains unaffected, and observability can be maintained continuously. This approach may provide a more efficient, reliable, and user-friendly approach to application observability, ensuring that enterprises can monitor and optimize their software systems with minimal impact on their operations.

Figure 5:
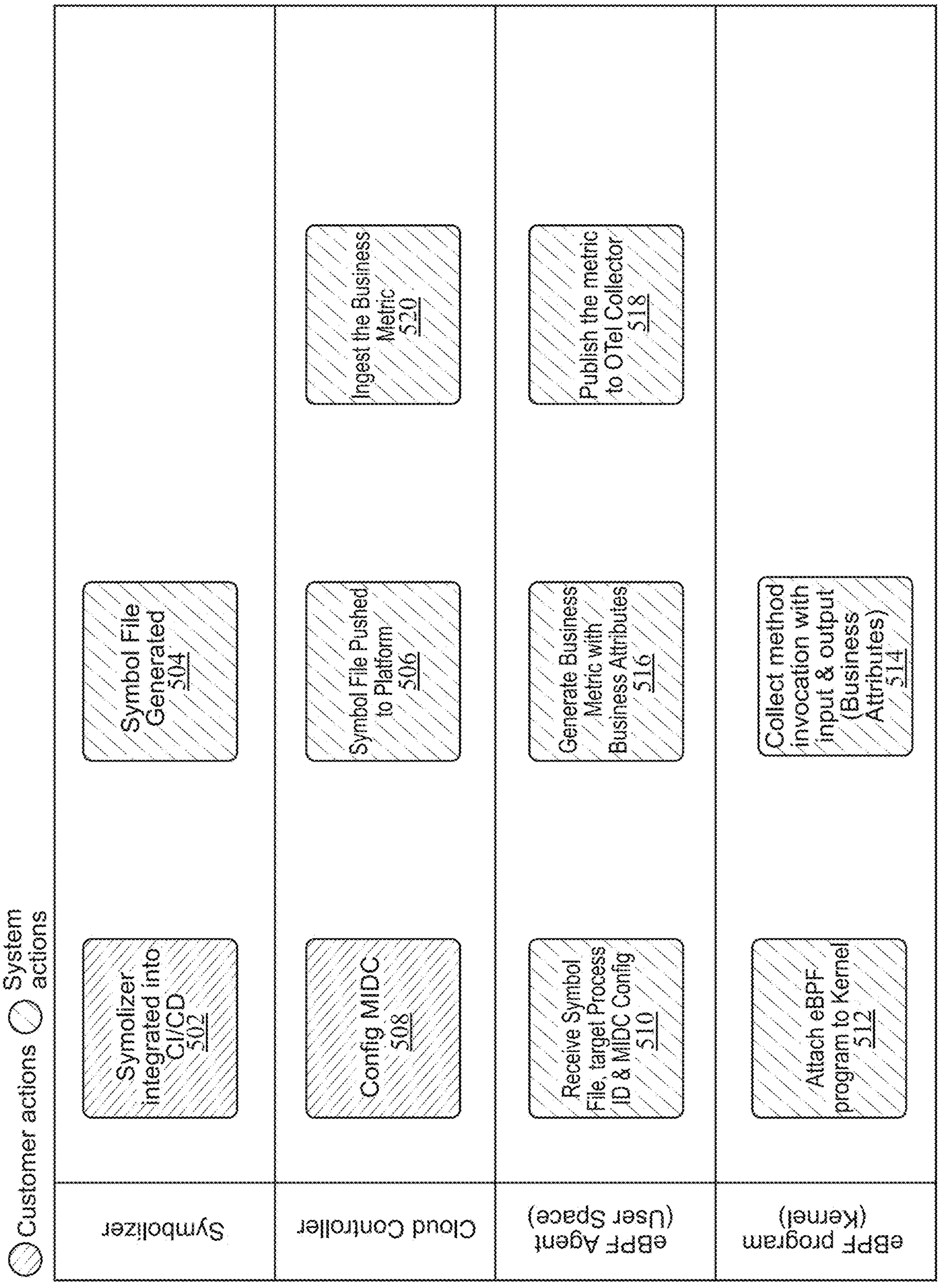
FIG. 5 illustrates an example of a process flow for eBPF-based method invocation data collection for agentless observability.

FIG. 5 illustrates an example of a process flow 500 for eBPF-based method invocation data collection for agentless observability, in accordance with one or more implementations described herein. Process flow 500 may be in the context of a user that is currently monitoring their Kubernetes environment using eBPF.

At box 502, a DevOps owner may download the symbolizer utility from the application controller and integrate it in their CI/CD workflow. At box 504, the CI/CD workflow may generate the symbol file for the target application and, at box 506, uploads it to the cloud controller.

The target application may be deployed to the Kubernetes cluster. The DevOps user may select the application of interest for obtaining the operational metric (e.g., business metric, etc.) on the cloud controller UI. On entering the configuration workflow, the APM controller app may load the function methods and parameters from the symbol file and allow the user to, at box 508, build a MIDC configuration.

At box 510, the cloud controller may push this MIDC configuration file, the target application processId, and the symbol file to the APM eBPF agent. At box 512, the agent may attach to the processID and adds an uprobe/uretprobe to monitor the execution of the target function based on the MIDC configuration. As would be appreciated, a uprobe inserts a BPF probe where the target function is called, whereas a uretprobe inserts a probe where the target function returns.

Then, when the probe returns to the user space, the function parameters and return values may be collected as operational metrics (e.g., business metrics, etc.). For example, at box 514 the method invocation may be collected with input and output (e.g., operational/business attributes).

At box 516, operational metrics (e.g., business metrics) with operational attributes (e.g., business attributes) may be generated.

The user space application may then send the metric upstream to the cloud controller. For example, at box 518 the operational metrics may be published to a telemetry data collector (e.g., an OpenTelemetry collector, etc.). Then, at box 520, the cloud controller may ingest the operational metric. The operational metrics may be stored in databases and/or be utilized to generate performance monitoring visualizations and perform root cause analysis operations.

Figure 6:
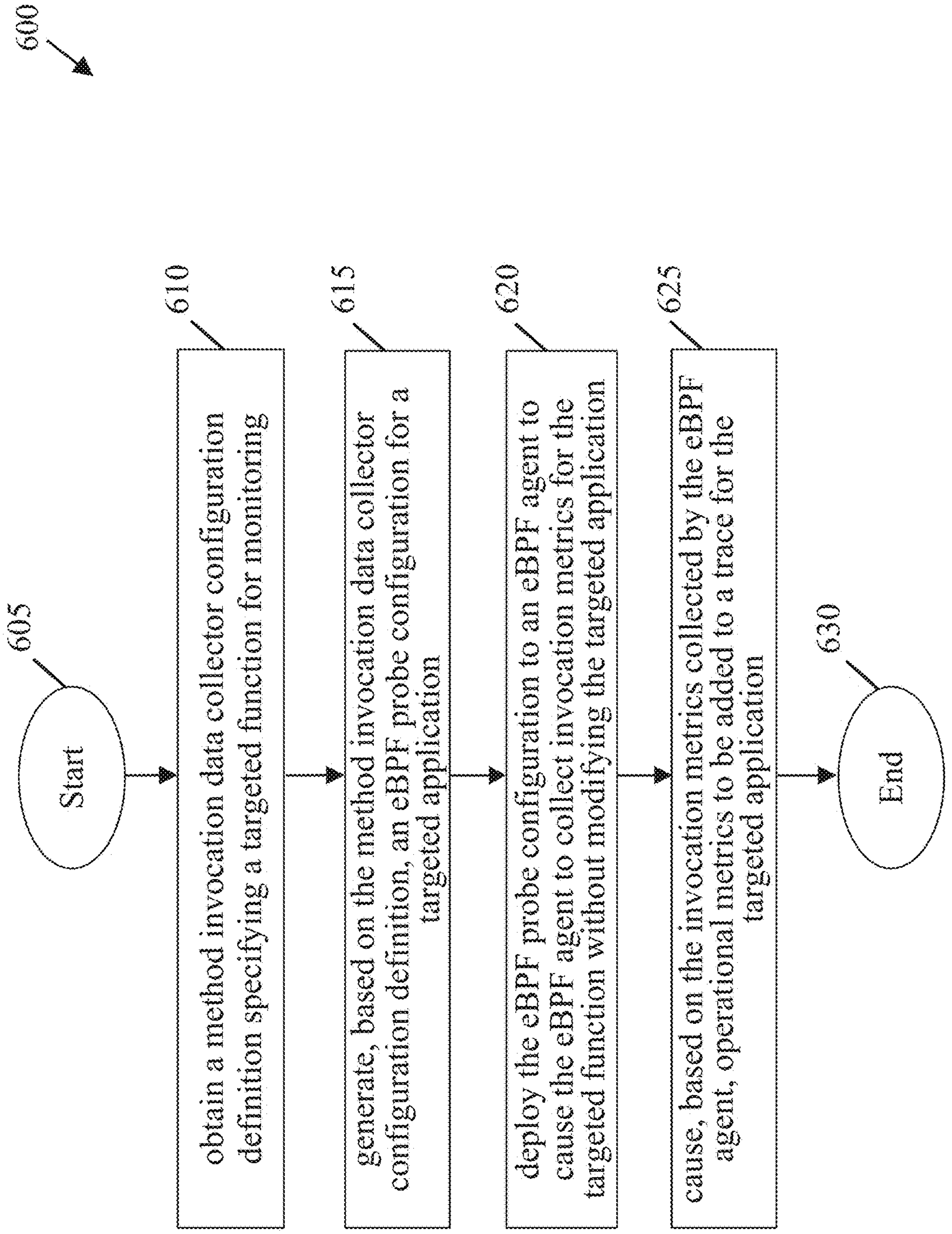
FIG. 6 illustrates an example of a simplified procedure for eBPF-based method invocation data collection for agentless observability, in accordance with one or more implementations described herein.

FIG. 6 illustrates an example of a simplified procedure for eBPF-based method invocation data collection for agentless observability, in accordance with one or more implementations described herein. For example, a non-generic, specifically configured device (e.g., device 200), may perform procedure 600 (e.g., a method) by executing stored instructions (e.g., method invocation metric collection process 248).

The procedure 600 may start at step 605, and continues to step 610, where, as described in greater detail above, the device (e.g., a controller, processor, etc.) may obtain a method invocation data collector configuration definition specifying a targeted function for monitoring. The method invocation data collector configuration definition may be defined based on functional methods and parameters specified in a symbol file that maps function names to their corresponding memory addresses generated, the symbol file is generated during a development workflow for the targeted application.

At step 615, as detailed above, the device may generate, based on the method invocation data collector configuration definition, an extended eBPF probe configuration for a targeted application. The eBPF probe configuration may be configured to cause the eBPF agent to attach to a process identification of the targeted application and cause a probe to be added to monitor the targeted function. The probe may be a uprobe and/or a ureprobe.

At step 620, the device may deploy the eBPF probe configuration to an eBPF agent to cause the eBPF agent to collect invocation metrics for the targeted function without modifying the targeted application. This may include pushing the method invocation data collector configuration definition, a process identification of the targeted application, and the symbol file to the eBPF agent. The eBPF probe configuration may be dynamically updated and/or redeployed without restarting the targeted application. This allows administrators flexibility in selecting and changing the operational metrics they are monitoring in order to meet emerging demands in real-time without the need for code revision to and redeployment of their deployed applications.

At step 625, the device may cause, based on the invocation metrics collected by the eBPF agent, operational metrics to be added to a trace for the targeted application. This may include reporting the operational metrics to an OpenTelemetry collector. The invocation metrics collected by the eBPF agent may include function parameters and return values of the targeted function. Offsets in the symbol file may be utilized to extract method parameters and/or return code utilized for generating the operational metrics.

Procedure 600 may then end at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, offers a significant advancement in the field of application observability by leveraging the capabilities of eBPF technology to collect operational attributes (e.g., business attributes, etc.) and method invocation metrics directly from running applications. Unlike traditional methods that require code changes and downtime, these techniques enable customers to extract valuable operational metrics (e.g., business metrics, etc.) without any service interruption. By utilizing the symbol file generated during application builds, users can construct a method invocation data collector (MIDC) configuration that dynamically configures eBPF probes. This approach allows for the extraction of method parameters and return codes using offsets in the symbol file, facilitating targeted data collection tailored to specific monitoring objectives. While existing eBPF applications provide general tracing insights, they lack the specialized, dynamic configuration necessary for precise and predefined monitoring criteria. These techniques address this gap by offering a configurable agentless approach that avoids the need for redeployment, thus enabling real time monitoring and performance analysis without degrading application performance. This comprehensive, non-intrusive methodology surpasses piecemeal solutions by providing a cohesive and efficient way to collect and analyze business metrics.

While there have been shown and described illustrative implementations that provide for eBPF-based method invocation data collection for agentless observability, it is to be understood that various other adaptations and modifications may be made within the intent and scope of the implementations herein. In addition, while certain processes are shown, other suitable processes may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method, comprising:

obtaining, by a device, a method invocation data collector configuration definition specifying a targeted function for monitoring;

generating, by the device and based on the method invocation data collector configuration definition, an extended Berkeley Packet Filter probe configuration for a targeted application;

deploying, by the device, the extended Berkeley Packet Filter probe configuration to an extended Berkeley Packet Filter agent to cause the extended Berkeley Packet Filter agent to collect invocation metrics for the targeted function without modifying the targeted application; and causing, by the device and based on the invocation metrics collected by the extended Berkeley Packet Filter agent, operational metrics to be added to a trace for the targeted application.

2. The method as in claim 1, further comprising:

dynamically updating the extended Berkeley Packet Filter probe configuration without restarting the targeted application.

3. The method as in claim 1, wherein causing the operational metrics to be added to the trace for the targeted application includes reporting the operational metrics to an OpenTelemetry collector.

4. The method as in claim 1, wherein the method invocation data collector configuration definition is defined based on functional methods and parameters specified in a symbol file that maps function names to their corresponding memory addresses generated.

5. The method as in claim 4, further comprising:

utilizing offsets in the symbol file to extract method parameters and return code utilized for generating the operational metrics.

6. The method as in claim 4, wherein the symbol file is generated during a development workflow for the targeted application.

7. The method as in claim 4, wherein deploying the extended Berkeley Packet Filter probe configuration includes pushing the method invocation data collector configuration definition, a process identification of the targeted application, and the symbol file to the extended Berkeley Packet Filter agent.

8. The method as in claim 1, wherein the extended Berkeley Packet Filter probe configuration is configured to cause the extended Berkeley Packet Filter agent to attach to a process identification of the targeted application and cause a probe to be added to monitor the targeted function.

9. The method as in claim 8, wherein the probe is a uprobe or a ureprobe.

10. The method as in claim 1, wherein the invocation metrics collected by the extended Berkeley Packet Filter agent include function parameters and return values of the targeted function.

11. An apparatus, comprising:

one or more network interfaces;

a processor coupled to the one or more network interfaces and configured to execute one or more processes; and a memory configured to store a process that is executable by the processor, the process when executed configured to:

obtain a method invocation data collector configuration definition specifying a targeted function for monitoring;

generate, based on the method invocation data collector configuration definition, an extended Berkeley Packet Filter probe configuration for a targeted application;

deploy the extended Berkeley Packet Filter probe configuration to an extended Berkeley Packet Filter agent to cause the extended Berkeley Packet Filter agent to collect invocation metrics for the targeted function without modifying the targeted application; and cause, based on the invocation metrics collected by the extended Berkeley Packet Filter agent, operational metrics to be added to a trace for the targeted application.

12. The apparatus as in claim 11, wherein the process is further configured to:

dynamically update the extended Berkeley Packet Filter probe configuration without restarting the targeted application.

13. The apparatus as in claim 11, wherein the operational metrics are caused to be added to the trace for the targeted application by reporting the operational metrics to an OpenTelemetry collector.

14. The apparatus as in claim 11, wherein the method invocation data collector configuration definition is defined based on functional methods and parameters specified in a symbol file that maps function names to their corresponding memory addresses generated.

15. The apparatus as in claim 14, wherein the process is further configured to:

utilize offsets in the symbol file to extract method parameters and return code utilized for generating the operational metrics.

16. The apparatus as in claim 14, wherein the symbol file is generated during a development workflow for the targeted application.

17. The apparatus as in claim 14, wherein deploying the extended Berkeley Packet Filter probe configuration includes pushing the method invocation data collector configuration definition, a process identification of the targeted application, and the symbol file to the extended Berkeley Packet Filter agent.

18. The apparatus as in claim 11, wherein the extended Berkeley Packet Filter probe configuration is configured to cause the extended Berkeley Packet Filter agent to attach to a process identification of the targeted application and cause a probe to be added to monitor the targeted function.

19. The apparatus as in claim 11, wherein the invocation metrics collected by the extended Berkeley Packet Filter agent include function parameters and return values of the targeted function.

20. A tangible, non-transitory, computer-readable medium storing program instructions that cause a device to execute a process comprising:

obtaining a method invocation data collector configuration definition specifying a targeted function for monitoring;

generating, based on the method invocation data collector configuration definition, an extended Berkeley Packet Filter probe configuration for a targeted application;

deploying the extended Berkeley Packet Filter probe configuration to an extended Berkeley Packet Filter agent to cause the extended Berkeley Packet Filter agent to collect invocation metrics for the targeted function without modifying the targeted application; and causing, based on the invocation metrics collected by the extended Berkeley Packet Filter agent, operational metrics to be added to a trace for the targeted application.

* * * * *